Jan. 1, 1952  G. F. KAROW  2,581,025
POWER TRANSMITTING MECHANISM FOR VEHICLES
Filed June 10, 1949  3 Sheets-Sheet 1
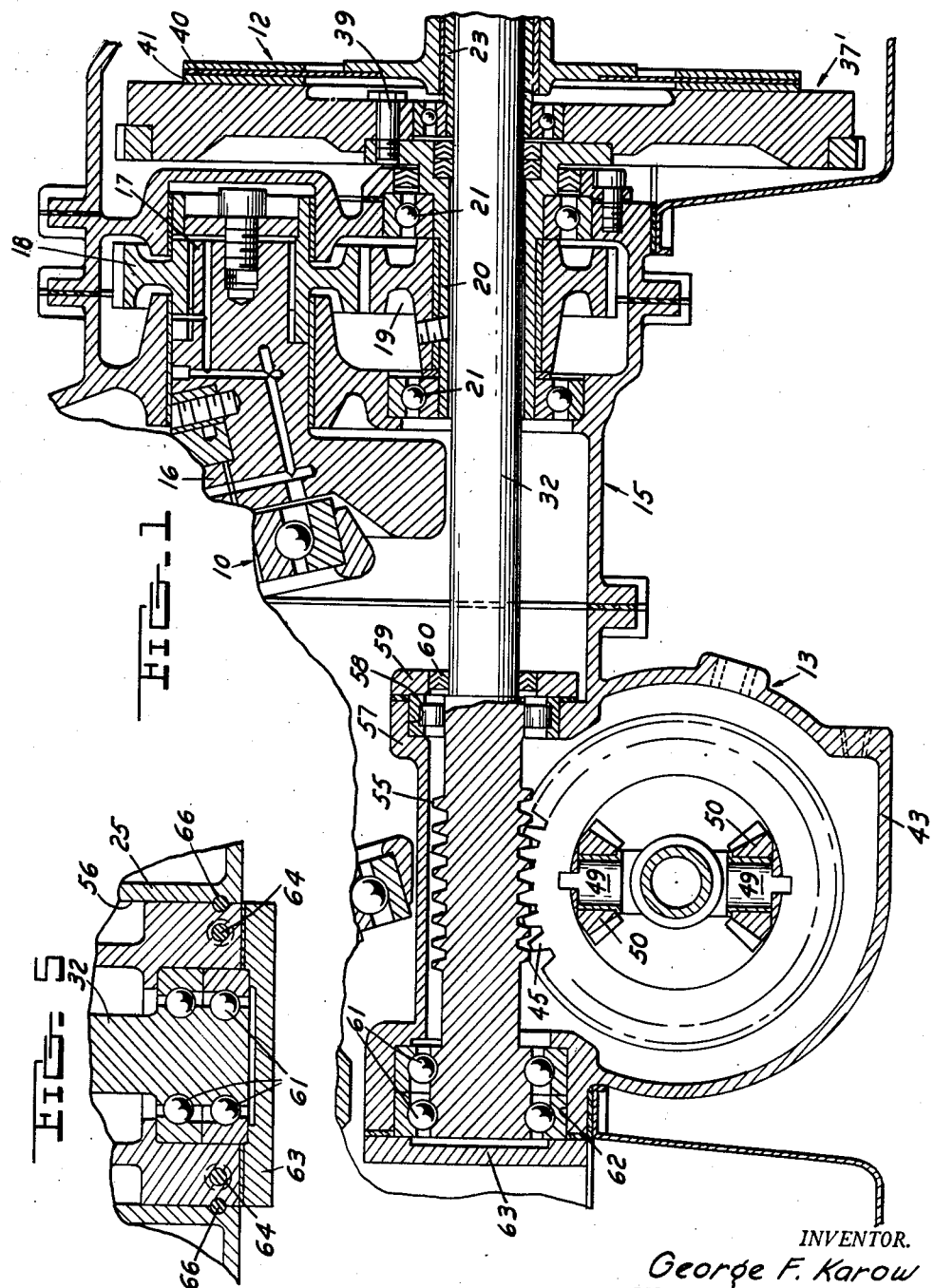
INVENTOR.
George F. Karow
BY
Whittemore Hulbert & Belknap
ATTORNEYS

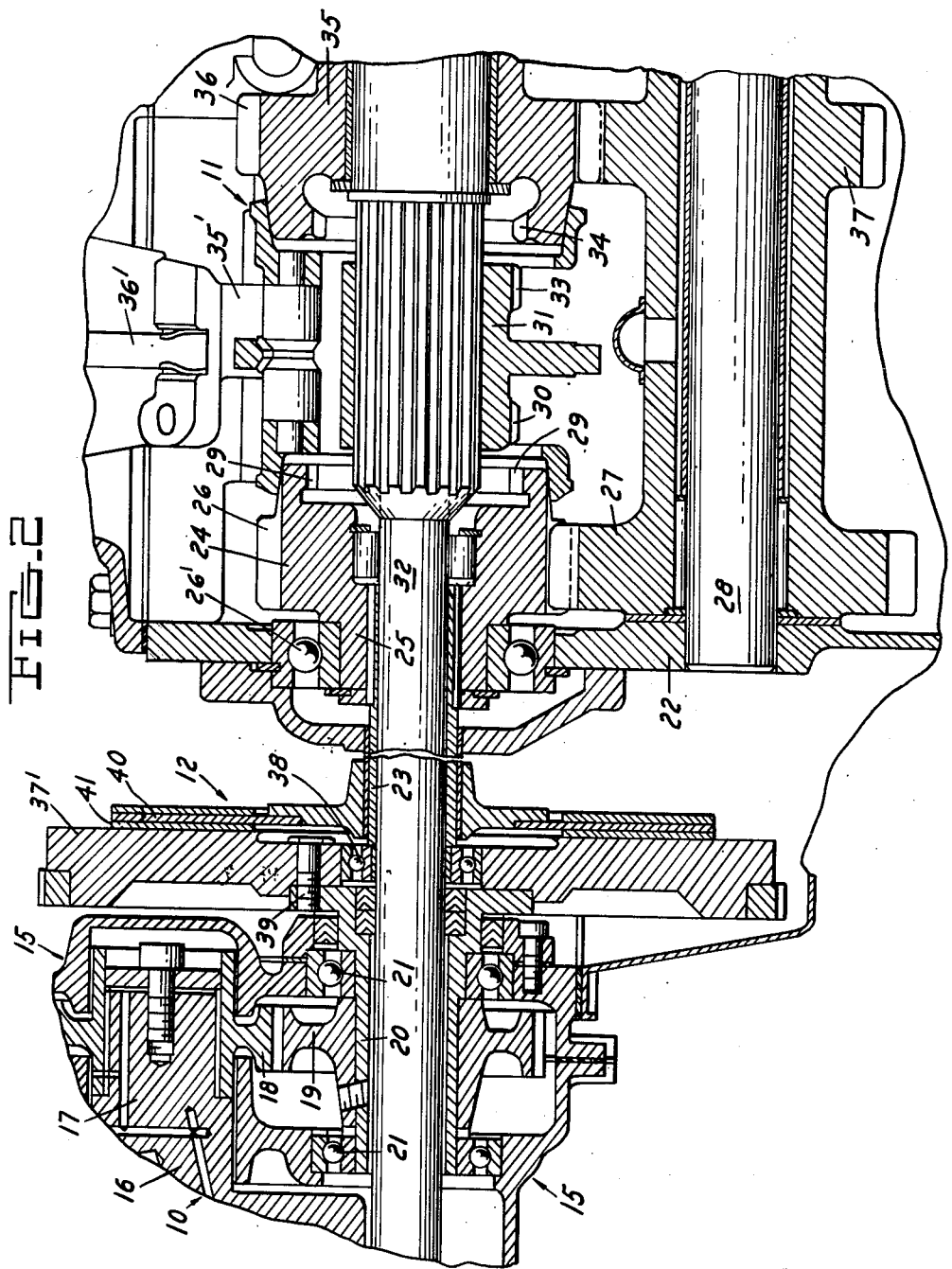

Jan. 1, 1952            G. F. KAROW            2,581,025
POWER TRANSMITTING MECHANISM FOR VEHICLES
Filed June 10, 1949            3 Sheets-Sheet 3
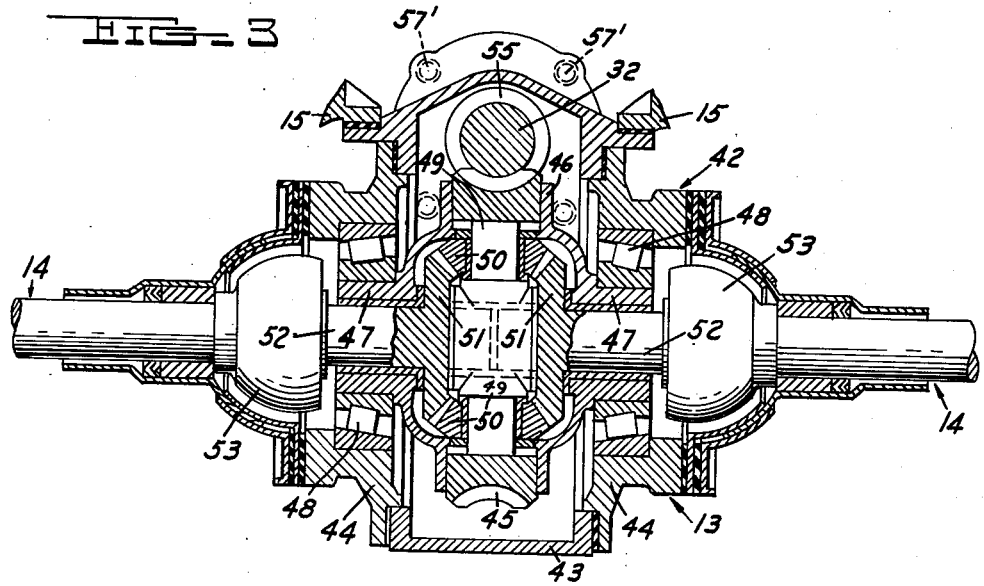
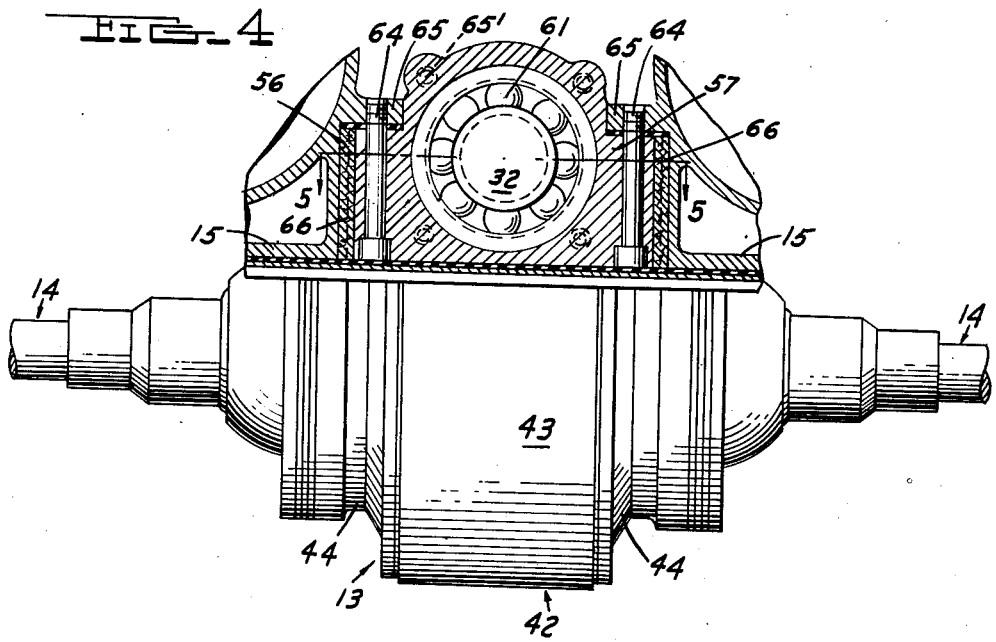
INVENTOR.
George F. Karow
BY
ATTORNEYS Patented Jan. 1, 1952

2,581,025

UNITED STATES PATENT OFFICE 2,581,025

POWER-TRANSMITTING MECHANISM FOR VEHICLES

George F. Karow, Saginaw, Mich.

Application June 10, 1949, Serial No. 98,202

4 Claims. (Cl. 74—700)

This invention relates generally to power transmitting mechanisms of the type suitable for use in propelling motor vehicles, and refers more particularly to an improved driving connection between a power shaft of a prime mover, such for example, as an internal combustion engine and the drive shafts or axles to which the driving wheels are connected.

A power assembly of the type suitable for use in propelling vehicles ordinarily comprises an engine, variable speed means, a clutch for selectively connecting the variable speed means to the engine power shaft, independently rotatable drive shafts or axles, and differential drive means for connecting the drive shafts or axles to the power output of the variable speed means.

The above units of the power assembly are usually of substantial size and are ordinarily arranged to occupy some considerable space. This has proved to be a decidedly limiting factor in the design of motor vehicles, and presents a serious problem in obtaining the weight distribution required for optimum riding qualities.

With the above in view, it is one of the objects of this invention to arrange the above units in a compact assembly capable of being installed in a space which is small in comparison to the overall size of the units. Thus the assembly affords considerably more flexibility in design and enables installing the same in different positions to assure better weight distribution.

A more detailed object of this invention which contributes materially to obtaining a compact arrangement is to provide a power unit assembly wherein the wheel driving axles are supported directly below the engine intermediate the ends of the latter.

The foregoing as well as other objects will be made more apparent as this description proceeds, especially when considered in connection with the accompanying drawings, wherein:

Figure 1 is a fragmentary sectional view showing a part of an engine and a differential drive mechanism;

Figure 2 is a sectional view through one end portion of the engine and showing a part of a variable speed transmission in relation to the engine;

Figure 3 is a longitudinal sectional view through the differential drive unit;

Figure 4 is an elevational view partly in section of the differential drive unit; and Figure 5 is a sectional view taken substantially on the line 5—5 of Figure 4.

The power transmitting assembly selected herein for the purpose of illustrating the present invention is shown in the several figures of the drawings as comprising the following units: an engine 10, variable speed means 11, clutching means 12 for connecting the variable speed means to the engine, and differential drive mechanism 13 for connecting the power output side of the variable speed means 11 to a pair of drive shafts or axles 14.

The engine 10 may be in the form of an internal combustion engine of any suitable type, and is not shown in detail herein because it forms no part of the present invention. For the purpose of this description it will suffice to point out that the engine 10 comprises a sectional casing 15 and a power shaft 16 having one end 17 suitably journalled in bearings carried by the casing 15. A gear 18 is supported in bearings carried by the casing and is splined or otherwise secured to the end 17 of the power shaft 16. As shown in Figures 1 and 2 the gear 18 is arranged in mesh with a second gear 19 secured to a tubular driven shaft 20. The tubular driven shaft 20 has its axis extending substantially parallel to the axis of rotation of the power shaft 16, and is journalled in bearings 21 for rotation. The bearings 21 are respectively supported at opposite ends of the gear 19 and are carried by adjacent portions of the casing 15. Thus it will be noted from the above that the driven shaft 20 is connected to the power shaft 16 through the gears 18 and 19 for rotation by the power shaft 16.

The variable speed means 11 may be any one of a number of the automatic, semi-automatic or manually operable types of units. For the purpose of illustration and in the interests of simplicity, the variable speed means 11 is shown as a manually operable exchange gear type of transmission. It will also be understood that the transmission 11 may incorporate any number of forward speed gears together with a reverse gear. In the present instance only a portion of the transmission is shown, and it will be noted from Figure 2 of the drawings that the transmission embodies a housing 22 having an opening in one end wall through which a tubular power input shaft 23 extends.

A gear 24 is located within the housing 22 and is secured to the rear end of the shaft 23 in any suitable manner. The front end of the gear has an axially extending hub 25 which projects forwardly through the opening in the end wall of the housing, and is journalled in a bearing 26' supported by the end wall of the housing. The gear 24 is provided with external teeth 26 which mesh with a gear 27 secured to the usual countershaft 28 of the transmission. In addition the gear 24 has an internal series of teeth 29, which are concentrically arranged with respect to the axis of the shaft 23 and are adapted to mesh with a series of teeth 30 formed on the front end of a clutch part 31. The clutch part 31 is splined on a power output shaft 32, and serves to directly connect the shaft 32 to the shaft 23 when the teeth 30 are in mesh with the teeth 29. It will further be noted from Figure 2 of the drawings that the clutch part 31 has a second series of teeth 33 at the rear end, and these teeth are adapted to mesh with corresponding internal teeth 34 formed on the front end of a second speed gear 35. The second speed gear 35 is freely rotatably supported on the power output shaft 32, and has a series of external teeth 36 arranged in mesh with a gear 37 supported on the countershaft 28.

The clutch part 31 is shown in Figure 2 of the drawings in its neutral position wherein the clutch teeth 30 and 33 are out of meshing relationship with their corresponding clutch teeth 29 and 34 respectively. The arrangement is such that the rearward sliding movement of the part 31 on the power output shaft 32 meshes the teeth 33 with the teeth 34 on the gear 35 and thereby connects the power input shaft 23 to the power output shaft 32 through the countershaft to impart rotation to the shaft 32 at a reduced speed. This speed, of course, may be increased by shifting the part 31 forwardly to mesh the teeth 30 with the teeth 29 in the manner previously set forth. In accordance with conventional practice the part 31 is shifted to either position by a shifting fork 35', and a suitable operating member 36'.

In assembly the housing 22 for the transmission is supported in such a position that the axis of the power input shaft 23 is in alignment with the axis of the tubular driven shaft 20, and the forward end of the shaft 23 is connected to the driven shaft 20 through the medium of the clutch unit 12. The clutch unit 12 embodies a fly wheel 37' which is secured to the driven shaft 20 by suitable screws 39 and supports one end of the input shaft 23 in a bearing 38. Splined on the power input shaft 23 at the rear side of the flywheel 37' is a clutch plate 40 having friction material 41 at the front side for engagement with the rear face of the fly wheel to establish a driving connection between the driven shaft 20 and the power input shaft 23. The clutch plate 40 is normally yieldably urged into driving engagement with the fly wheel 37' by suitable spring means not shown, and is selectively operable to release the driving connection by a suitable mechanism well known to those skilled in this art.

Referring again to Figure 2 of the drawings, it will be noted that the power output shaft is extended co-axially through the power input shaft 23 and through the driven shaft 20. The front end portion of the power output shaft 32 is shown in Figure 1 of the drawings, and it will be noted that this shaft extends into the engine casing 15 in overlying relationship to the engine power shaft 16. In the present instance the front end portion of the shaft 32 is connected to both the drive axles or shafts 14 through the differential gearing 13.

The differential gearing 13 is included in a housing 42 comprising a center section 43 and end sections 44 removably secured to opposite sides of the center section by studs not shown herein. Located within the center section 43 of the housing 42 is a worm gear 45, and in accordance with conventional practice the ring gear is supported on a rotatable carrier 46 having tubular sections 47 at opposite sides respectively journalled in bearings 48. The bearings 48 are, in turn, respectively secured to the opposite end sections 44 of the housing 42, as clearly shown in Figure 3 of the drawings.

The worm gear 45 is provided with diametrically opposed radially inwardly extending shafts 49 and bevelled pinions 50 are respectively freely rotatably supported on the shafts 49. The pinions 50 mesh with suitable beveled gears 51 respectively secured to the inner ends of shafts 52, and the latter are respectively journalled in the tubular sections 47 of the carrier 46. The shafts 52 are aligned and for the purpose of this description are considered as sections of the drive shafts 14. The outer ends of the shafts 52 are respectively connected to the inner ends of the drive shafts 14 through the medium of suitable universal joints designated generally by the numeral 53. Thus it will be noted that the two drive shafts 14 are connected together through gearing which enables differential rotation of the drive shafts, and this feature is of prime importance in instances where the drive shafts 14 are connected to ground engaging wheels as is the case when the power transmitting assembly is applied to vehicles.

The drive shafts 14 are driven by the power output shaft 32 and for accomplishing this result, a threaded worm gear 55 is secured to or formed on the shaft 32 in a position to mesh with the worm gear 45. The housing 42 for the differential gearing is secured to the engine casing 15 in a position such that the drive shafts 14 extend in a direction transverse to the engine power shaft 16 at a point intermediate the ends of the latter shaft. This arrangement contributes materially to reducing the overall size of the power transmitting assembly, and enables installing the same in a relatively small space.

In detail it will be noted from Figures 1 and 4 that the engine casing 15 has a recess 56 in the underside thereof of sufficient dimension to receive the upper portion 57 of the housing 42. The recess 56 in the engine casing registers with the front end portion of the shaft 32 and enables extending this portion of the shaft through the top portion 57 of the differential gear housing 42. As shown particularly in Figure 1, the rear end of the top portion 57 has an opening 58 for receiving the shaft 32, and a cap 59 is secured to the rear end of the portion 57 by suitable studs 57'. The cap is centrally apertured to receive the shaft 32 and a suitable packing seal 60 is provided for sealing the joint between the shaft 32 and cap. The front end of the shaft 32 beyond the worm gear 55 is journalled in bearings 61, which in turn, are secured within an opening 62 in the front wall of the top portion 57. This opening is closed by a cap 65 removably secured in place by suitable studs 65'.

Referring now more in detail to Figure 4 of the drawings, it will be noted that the top portion 57 of the housing 42 is secured in place in the recess 56 by studs 64, which are threaded into attaching lugs 65 formed on the engine casing 15. The joints between the housing 42 and engine casing 15 are effectively sealed against the escape of lubricant. In this connection attention is called to Figures 4 and 5 of the drawings wherein it will be noted that dowel type seals 66 are employed between opposite walls of the top portion 57 and the adjacent walls of the recess 56. Other sealing gaskets are installed at the appropriate places to prevent leakage of lubricant from either the housing 42 or the engine casing 15.

What I claim as my invention is:

1. Power transmission mechanism comprising an engine having a casing and a power shaft journaled in an end wall thereof, mechanism to be driven directly beneath said casing adjacent thereto, a tubular shaft below said power shaft journaled in the same end wall of said casing and extending outward therefrom, gearing connecting said shafts adjacent to said end wall, a shaft within said tubular shaft extending inward beyond the same and having driving connection to said mechanism, and a variable speed transmission mechanism mounted on the outwardly projecting portion of said tubular shaft and connected at the outer end thereof with said inner shaft.

2. The construction as in claim 1 in which said mechanism includes a pair of shafts extending transversely and upon opposite sides of said engine, and a differential gearing between said shafts which is driven by said inner shaft.

3. The construction as in claim 1 having a flywheel on the outer end of said tubular shaft, and a friction clutch forming a connection between the same and said inner shaft.

4. Power transmission mechanism comprising an engine having a power shaft supported for rotation, mechanism to be driven by the power shaft supported directly beneath said engine adjacent thereto, a tubular shaft supported for rotation below said power shaft and extending in generally parallel relationship with said power shaft, gearing connecting said shafts, a shaft within said tubular shaft extending beyond the latter and having driving connection to said mechanism, and means including a variable speed transmission mechanism supported beyond one end of said engine and interconnecting said tubular shaft and inner shaft.

GEORGE F. KAROW.

REFERENCES CITED

The following references are of record in the file of this patent:

UNITED STATES PATENTS

| Number | Name | Date |
|---|---|---|
| 1,808,109 | Heinze | June 2, 1931 |
| 1,880,270 | Noble | Oct. 4, 1932 |
| 1,934,191 | Hoffman | Nov. 7, 1933 |
| 2,138,618 | Seyerle | Nov. 29, 1938 |
| 2,316,477 | Weaver | Apr. 13, 1943 |

FOREIGN PATENTS

| Number | Country | Date |
|---|---|---|
| 439,409 | France | June 13, 1912 |
| 459,247 | Germany | Apr. 30, 1928 |
| 735,450 | France | Nov. 8, 1932 |